United States Patent
Sun

(10) Patent No.: US 9,891,115 B2
(45) Date of Patent: Feb. 13, 2018

(54) MICROCHIP SENSOR DIN HOUSING STRUCTURE

(71) Applicant: HON HAI PRECISION INDUSTRY CO., LTD., New Taipei (TW)

(72) Inventor: Zong-Yuan Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 383 days.

(21) Appl. No.: 14/605,203

(22) Filed: Jan. 26, 2015

(65) Prior Publication Data

US 2016/0084716 A1    Mar. 24, 2016

(30) Foreign Application Priority Data

Sep. 19, 2014   (CN) .......................... 2014 1 0478438

(51) Int. Cl.
  *G01K 1/14*  (2006.01)
(52) U.S. Cl.
  CPC ........... *G01K 1/14* (2013.01); *G01K 2207/04* (2013.01)

(58) Field of Classification Search
  USPC .......................................................... 374/208
  See application file for complete search history.

(56) References Cited

U.S. PATENT DOCUMENTS

| | | | |
|---|---|---|---|
| 7,922,511 B1* | 4/2011 | Schweitzer | H01R 13/622 439/171 |
| 2007/0100253 A1* | 5/2007 | Sisk | G01K 13/002 600/549 |
| 2010/0136808 A1* | 6/2010 | Vanzo | H01R 13/625 439/118 |
| 2010/0238973 A1* | 9/2010 | Gilchrist, III | G01K 1/08 374/208 |

* cited by examiner

*Primary Examiner* — Lisa Caputo
*Assistant Examiner* — Nasir U Ahmed
(74) *Attorney, Agent, or Firm* — ScienBiziP, P.C.

(57) ABSTRACT

A sensor structure includes a fixing assembly and a sensing assembly. The fixing assembly includes a connection member. The sensing assembly includes a sleeve, an engaging member, a microchip, and a fastening member. The engaging member is received in the sleeve and is detachably engaged with the connection member. The microchip is coupled to the engaging member and is received in the sleeve. The fastening member latches the sleeve and is detachably fit around the connection member.

16 Claims, 5 Drawing Sheets

MICROCHIP SENSOR DIN HOUSING STRUCTURE

FIELD

The subject matter herein generally relates to sensors, and particularly to a sensor structure used in a cold chain transportation device.

BACKGROUND

To facilitate and extend a shelf life of products, such as, for example, chemicals, foods, and pharmaceutical drugs, from manufacture through distribution, a temperature-controlled supply chain (sometimes referred to as a cold chain) is required. Generally, the cold chain includes a large number of temperature sensors. For the cold chain to be safe, an operator must frequently check and calibrate each temperature sensor, and calibration must be done quite frequently in order to insure an accuracy of the temperature sensors.

BRIEF DESCRIPTION OF THE DRAWINGS

Implementations of the present technology will now be described, by way of example only, with reference to the attached figures.

DETAILED DESCRIPTION

Figure 1:
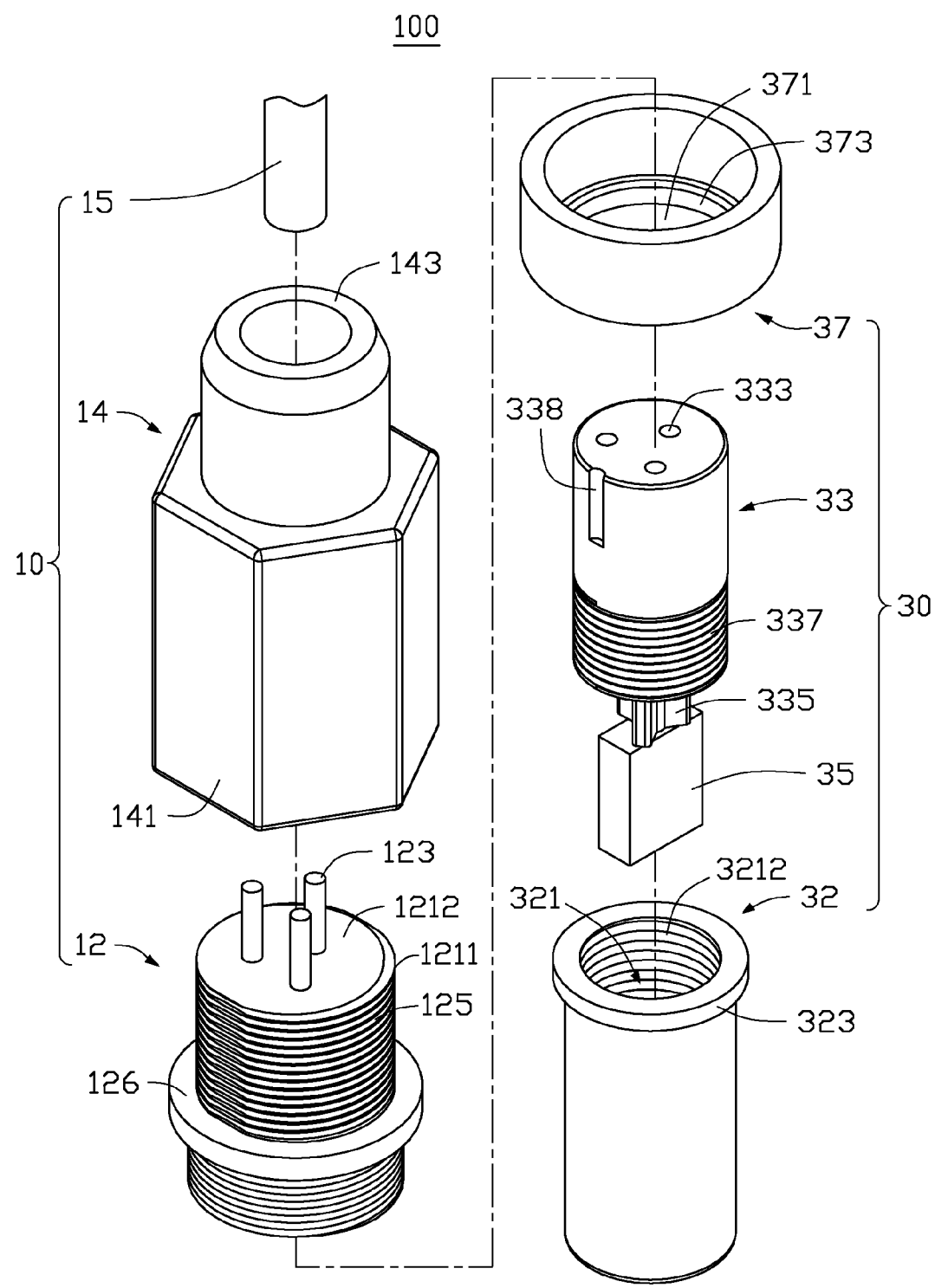
FIG. 1 is an exploded, isometric view of a sensor structure, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a sensor structure.

Figure 2:
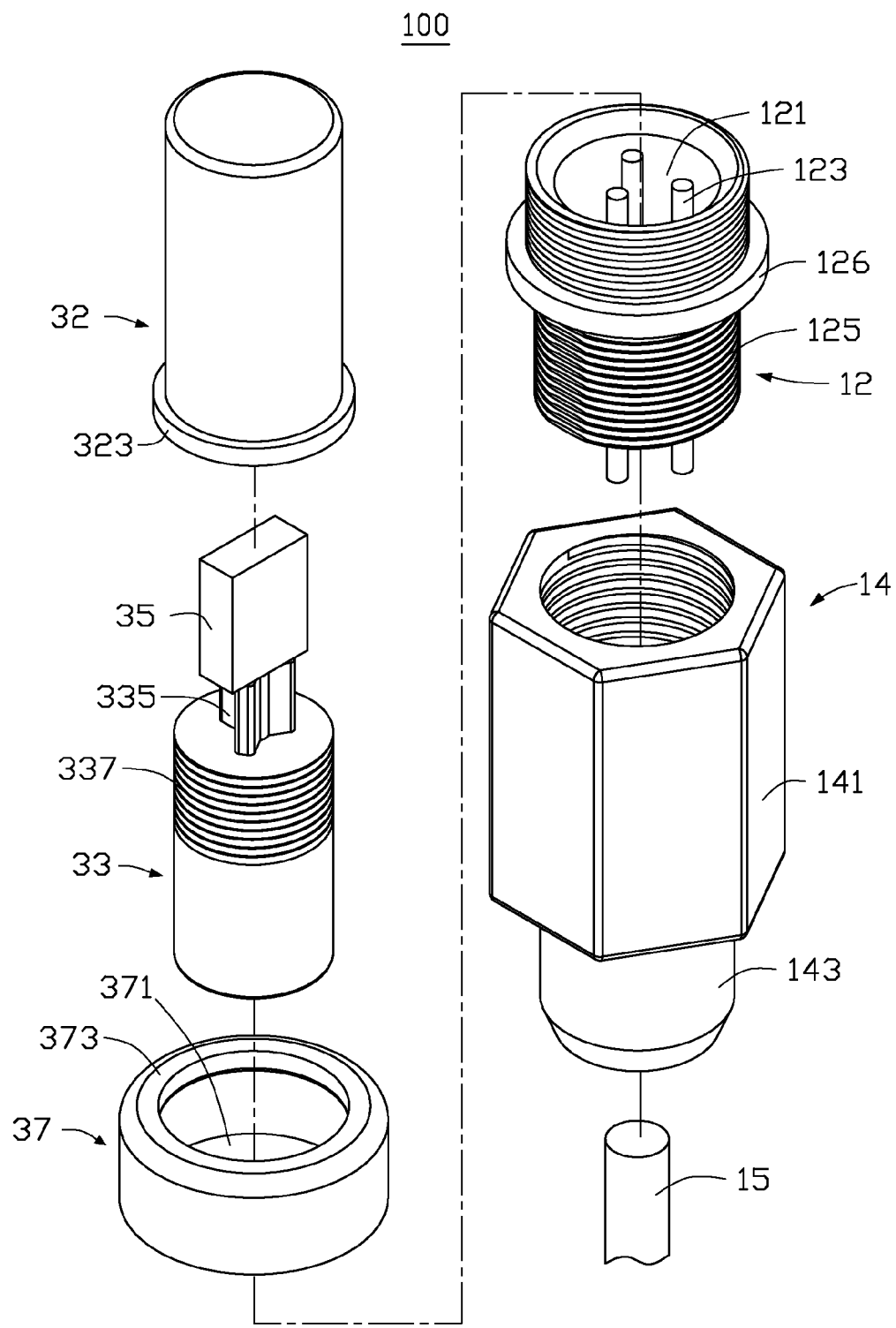
FIG. 2 is similar to FIG. 1, but shown from another angle.

FIGS. 1 and 2 illustrate an embodiment of a sensor structure 100, according to an exemplary embodiment. In at least one embodiment, the sensor structure 100 is a temperature sensor and consequently can be employed in a cold chain transportation device (not shown) for sensing a temperature of the cold chain transportation device. In other embodiments, the sensor structure 100 can also be a humidity sensor, a smoke sensor, or a proximity sensor.

The sensor structure 100 includes a fixing assembly 10 and a sensing assembly 30. The fixing assembly 10 is mechanically coupled to the sensing assembly 30 and is secured on a frame of the cold chain transportation device.

The fixing assembly 10 includes a connection member 12, a barrel 14, and a wire 15. In at least one embodiment, the connection member 12 is substantially a hollow cylinder. The connection member 12 includes a peripheral wall 1211 and a bottom wall 1212 disposed at an end of the peripheral wall 1211, the bottom wall 1212 and the peripheral wall 1211 jointly define a groove 121 for partially receiving the sensing assembly 30. Optionally, a guiding block (not shown) is protruded inwardly from the peripheral wall 1211 for guiding the sensing assembly 30, and details of these feature will be illustrated below. In addition, the connection member 12 further includes a plurality of connectors 123, a first end of each connector 123 is accommodated in the groove 121 for electronically coupling to the sensing assembly 30, and a second end of each connector 123 passes through the bottom wall 1212 for electronically coupling to the wire 15. Further, the peripheral wall 1211 forms a first screw thread 125 for engaging with the barrel 14 and the sensing assembly 30. A limiting portion 126 is protruded outwardly from the peripheral wall 1211, thereby holding the connection member 12 at an optimum position relative to the barrel 14.

The barrel 14 includes a connection end 141 and a latching end 143 connected to the connection end 141, both the connection end 141 and the latching end 143 are substantially hollow cylinders and communicate with each other. In at least one embodiment, an inner diameter of the connection end 141 is greater than an inner diameter of the latching end 143. The connection end 141 forms a second screw thread (not labeled) to threadedly engage with the first screw thread 125 of the connection member 12, and the latching end 143 latches the wire 15. In detail, the wire 15 passes though the latching end 143, and then is electronically coupled to the connectors 123. In an exemplary embodiment, adhesives, such as epoxy adhesives, can be poured into the barrel 14 to seal the wire 15 and the connectors 123. Thus, the fixing assembly 10 can be waterproof.

The sensing assembly 30 includes a sleeve 32, an engaging member 33, a microchip 35, and a fastening member 37. The sleeve 32 is substantially a hollow cylinder, which can be made of materials with good heat conduction performance, such as aluminium alloy. The sleeve 32 defines a receiving space 321 to receive the microchip 35 and threadedly engages with the engaging member 33. Additionally, a flange 323 is protruded outwardly from an opening end of the sleeve 32 for resisting the fastening member 37. The engaging member 33 is electronically coupled between the plurality of connectors 123 and the microchip 35. In detail, a first end of the engaging member 33 defines a plurality of connecting holes 333 for receiving the plurality of connectors 123, respectively, and an extending portion 335 extends from a second end of the engaging member 33 for coupling to the microchip 35. In at least one embodiment, an inner screw thread 3212 is formed on an inner wall of the sleeve 32, and an outer screw thread 337 is formed on a first end of the engaging member 33 to engage with the inner screw thread 3212. Further, a second end of the engaging member 33 defines a guiding groove 338 to guide the guiding block protruded from the peripheral wall 1211 to facilitate engagement of the connectors 123 and the connecting holes 333. In at least one embodiment, the microchip 35 is a temperature sensor and is configured to sense the temperature of the cold chain transportation device.

The fastening member 37 is configured to secure the sleeve 32, the engaging member 33, and the microchip 35 to the fixing assembly 10. In at least one embodiment, the fastening member 37 is substantially a ring structure. The fastening member 37 defines a mounting hole 371 to partially fit around the connection member 12 and to allow the sleeve 32 to pass through the fastening member 37. Optionally, the fastening member 37 threadedly engages with the connection member 12. Additionally, a resisting ring 373 is protruded inwardly from an end of the fastening member 37 for resisting the flange 323.

Figure 3:
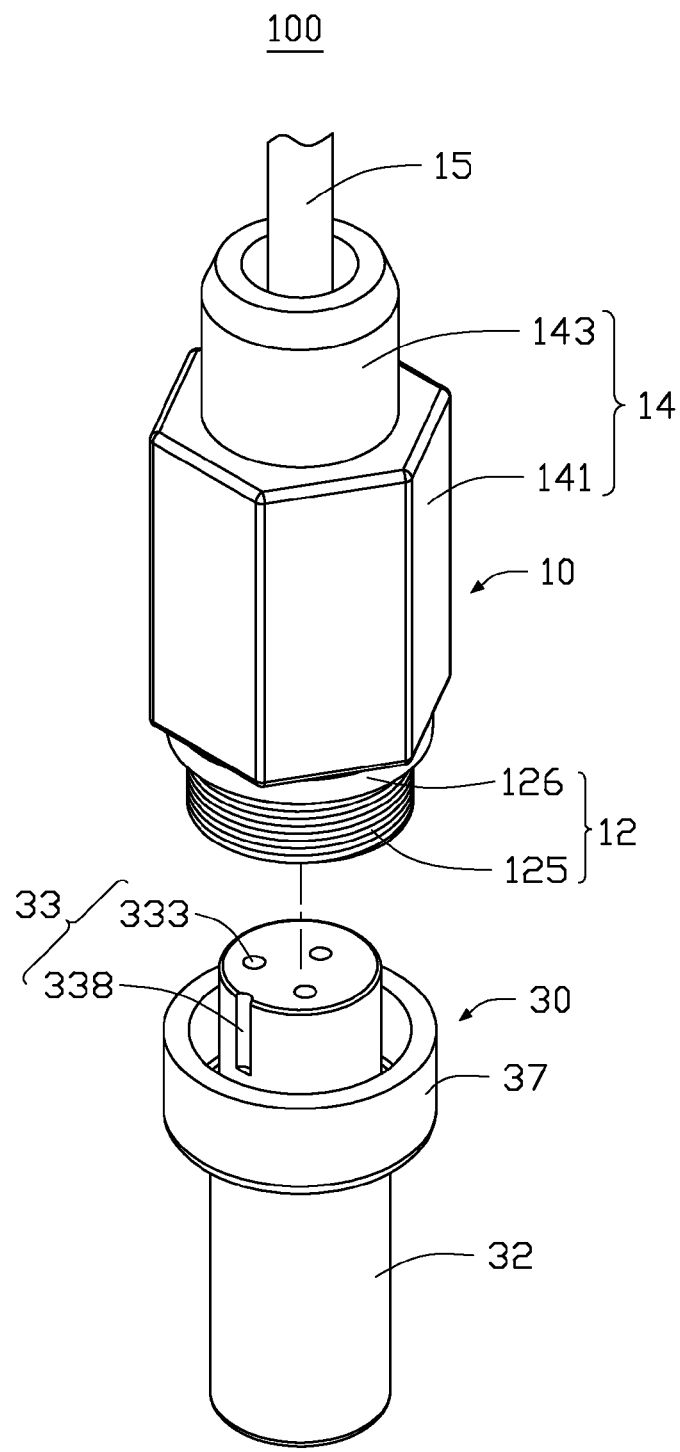
FIG. 3 is a partially assembled, isometric view of the sensor structure of FIG. 1.
Figure 4:
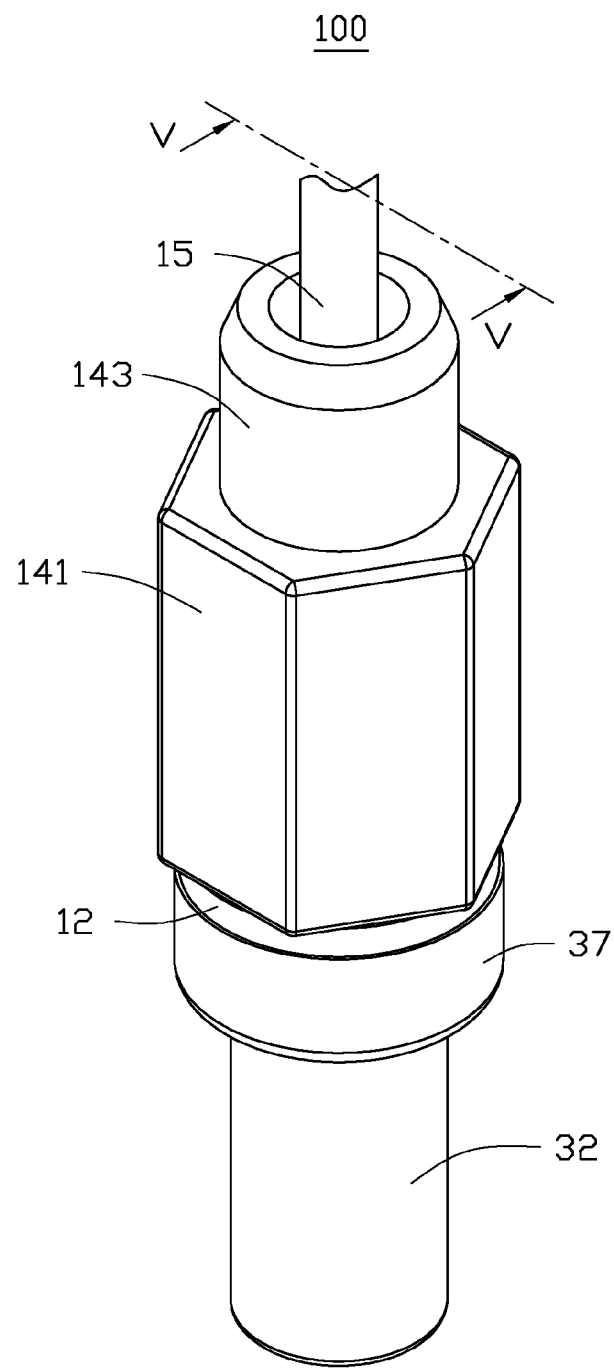
FIG. 4 is an assembled, isometric view of the sensor structure of FIG. 1.
Figure 5:
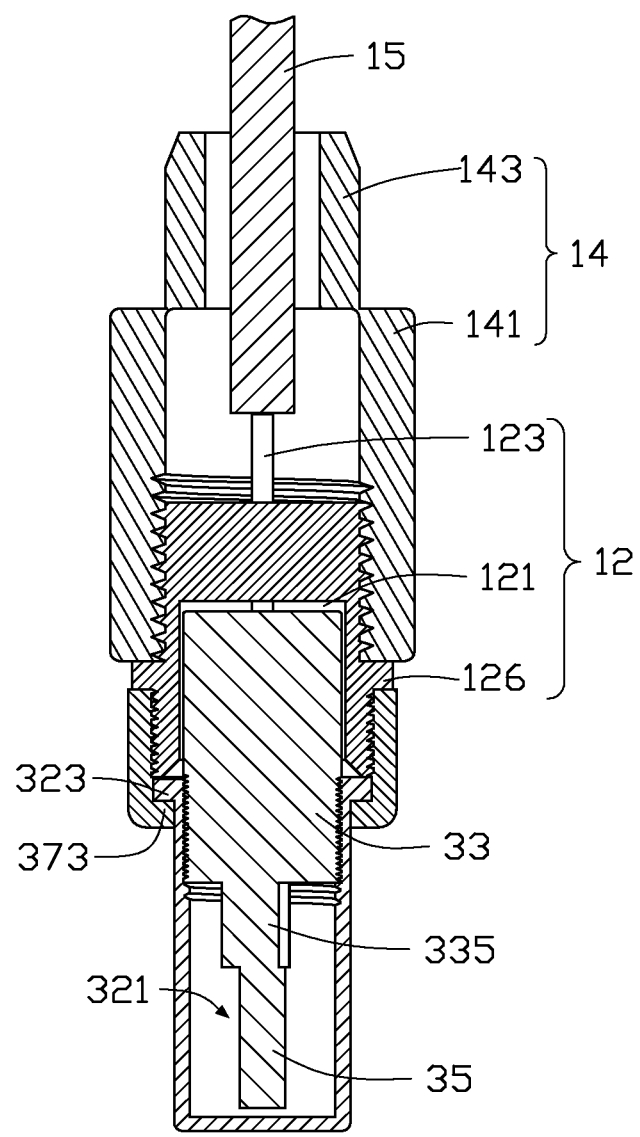
FIG. 5 is a cross-sectional view taken along line V-V of FIG. 4.

In assemble, referring to FIGS. 3-5, the connection member 12 is threadedly engaged with the connection end 141 of the barrel 14, the microchip 35 is received in the receiving space 321 of the sleeve 32, and then the sleeve 32 is threadedly engaged with the engaging member 33. In addition, the engaging member 33 is inserted into the groove 121 of the connection member 12 to allow the plurality of connectors 123 to be received in the plurality of connecting holes 333, respectively. Further, the sleeve 32 passes through the fastening member 37, and the fastening member 37 threadedly engages with the connection member 12. At this time, the fastening member 37 resists the limiting portion 126, and the flange 323 abuts against the resisting ring 373. Thus, the engaging member 33 is sealed between the sleeve 32 and the connection member 12.

When the microchip 35 needs to be checked and calibrated, the fastening member 37 is disengaged from the connection member 12, and the sensing assembly 30 can be manually extracted out from the groove 121 of the connection member 12.

In summary, the sensor structure 100 includes the fixing assembly 10 and the sensing assembly 30, and the sensing assembly 30 further includes the engaging member 33 and the fastening member 37 cooperatively engaged with the connection member 12 of the fixing assembly 10. Thus, the sensing assembly 30 can be detachably retained in fixing assembly 10 to facilitate calibration.

The embodiments shown and described above are only examples. Many details are often found in the art such as the other features of the sensor structure. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. A sensor structure comprising:
   a fixing assembly comprising a connection member; and
   a sensing assembly comprising:
      a sleeve, a flange protruded outwardly from the sleeve;
      an engaging member received in the sleeve and detachably engaged with the connection member;
      a microchip coupled to the engaging member and received in the sleeve; and
      a fastening member latching the sleeve and detachably fit around the connection member;
   wherein the fastening member is substantially a ring structure, the fastening member defines a mounting hole to fit around the connection member, and the sleeve passes through the mounting hole; a resisting ring is protruded inwardly from an end of the fastening member for abutting against the flange.

2. The sensor structure as claimed in claim 1, wherein the sleeve forms an inner screw thread, and the engaging member forms an outer screw thread engaging with the inner screw thread.

3. The sensor structure as claimed in claim 1, wherein the engaging member comprises an extending portion, and the microchip is coupled to the extending portion.

4. The sensor structure as claimed in claim 1, wherein the fastening member threadedly engages with the connection member.

5. The sensor structure as claimed in claim 1, wherein a limiting portion is protruded outwardly from the connection member, the fastening member resists the limiting portion.

6. The sensor structure as claimed in claim 1, wherein the connection member comprises a plurality of connectors, the engaging member defines a plurality of connecting holes for receiving the plurality of connectors, respectively.

7. The sensor structure as claimed in claim 6, wherein the connection member is substantially a hollow cylinder, the connection member comprises a peripheral wall and a bottom wall disposed at an end of the peripheral wall, the bottom wall and the peripheral wall jointly define a groove to receive the engaging member.

8. The sensor structure as claimed in claim 7, wherein the fix assembly further comprises a barrel threadedly engaging with the connection member.

9. The sensor structure as claimed in claim 8, wherein the fix assembly further comprises a wire, the wire passes through the barrel.

10. The sensor structure as claimed in claim 9, wherein a first end of each connector is accommodated in the groove for electronically coupling to the engaging member, and a second end of each connector passes through the bottom wall for electronically coupling to the wire.

11. A sensor structure comprising:
   a fixing assembly comprising a connection member; and
   a sensing assembly comprising:
      a sleeve communicating with the connection member, a flange protruded outwardly from the sleeve;
      an engaging member threadedly engaging with the sleeve and detachably received in the connection member;
      a microchip received in the sleeve and electronically coupled to the connection member via the engaging member; and
      a fastening member latching the sleeve and threadedly engaging with the connection member;

wherein the fastening member is substantially a ring structure, the fastening member defines a mounting hole to fit around the connection member, and the sleeve passes through the mounting hole; a resisting ring is protruded inwardly from an end of the fastening member for abutting against the flange.

12. The sensor structure as claimed in claim 11, wherein the engaging member comprises an extending portion, and the microchip is coupled to the extending portion.

13. The sensor structure as claimed in claim 11, wherein a limiting portion is protruded outwardly from the connection member, the fastening member resists the limiting portion.

14. The sensor structure as claimed in claim 11, wherein the connection member comprises a plurality of connectors, the engaging member defines a plurality of connecting holes for receiving the plurality of connectors, respectively.

15. The sensor structure as claimed in claim 14, wherein the connection member is substantially a hollow cylinder, the connection member defines a groove to receive the engaging member.

16. The sensor structure as claimed in claim 15, wherein the fix assembly further comprises a barrel threadedly engaging with the connection member and a wire passing through the barrel and electronically coupling to the plurality of connectors.

* * * * *